(12) United States Patent
Hyser et al.

(10) Patent No.: US 9,176,560 B2
(45) Date of Patent: Nov. 3, 2015

(54) USE AND STATE BASED POWER MANAGEMENT

(75) Inventors: Chris D. Hyser, Victor, NY (US); Daniel Juergen Gmach, Palo Alto, CA (US); Yuan Chen, Sunnyvale, CA (US); Umesh Markandaya Lakshminarasimha, Bangalore Karnataka (IN); Suryanarayana Vijay, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 693 days.

(21) Appl. No.: 13/406,099

(22) Filed: Feb. 27, 2012

(65) Prior Publication Data

US 2013/0227317 A1    Aug. 29, 2013

(51) Int. Cl.
*G06F 1/00* (2006.01)
*G06F 1/32* (2006.01)

(52) U.S. Cl.
CPC .................................. *G06F 1/3203* (2013.01)

(58) Field of Classification Search
USPC ................................. 713/100, 300, 310, 320
See application file for complete search history.

(56) References Cited

U.S. PATENT DOCUMENTS

| | | | |
|---|---|---|---|
| 6,330,676 B1* | 12/2001 | Kelsey | 726/7 |
| 2003/0115024 A1* | 6/2003 | Snevely | 703/1 |
| 2009/0055665 A1 | 2/2009 | Maglione et al. | |
| 2009/0228726 A1 | 9/2009 | Malik et al. | |
| 2009/0240964 A1 | 9/2009 | Pfeiffer | |
| 2009/0271046 A1* | 10/2009 | Lewis et al. | 700/291 |
| 2010/0318828 A1* | 12/2010 | Elting et al. | 713/340 |
| 2011/0004684 A1 | 1/2011 | Lugo | |
| 2011/0016342 A1* | 1/2011 | Rowan et al. | 713/340 |
| 2012/0144216 A1* | 6/2012 | Hsieh et al. | 713/320 |
| 2012/0144219 A1* | 6/2012 | Salahshour et al. | 713/322 |

OTHER PUBLICATIONS

Liao, Warren T., Clustering of time series data—a survey, Pattern Recognition, Science Direct, Jan. 7, 2005.
Meisner, David, et al., PowerNap: Eliminating Server Idle Power, pp. 205-216, 2009.
NightWatchman Enterprise: The global leader in PC power management, I3-Market leader in IT efficiency NightWatchman Enterprise for PC power management, download date: Feb. 10, 2012. <http://www.1e.com/it-efficiency/software/nightwatchman-enterprise-pc-power-management/>.
Power Save Enterprise, Power Management Software—Reduce IT Costs, Faronics: Simplifying Computer Management. Download Date: Feb. 10, 2012. <http://www.faronics.com/enterprise/power-save/>.
Windows Management Instrumentation and Simple Network Management Protocol, Microsoft TechNet, 2012, Download Date: Feb. 10, 2012. <http://technet.microsoft.com/en-us/library/bb742612.aspx>.
Distributed Management Task Force, Inc., DMTF, Web-Based Enterprise Management, download date: Mar. 23, 2012. <http://www.dmtf.org/standards/wbem>.
Verdiem, Our customers have saved over $200m in energy costs, Download date: Mar. 23, 2012. <http://www.verdiem.com/>.

* cited by examiner

*Primary Examiner* — Zahid Choudhury
(74) *Attorney, Agent, or Firm* — Mannava & Kang, P.C.

(57) ABSTRACT

A method for power management may include collecting data related to resource utilization and process information from a server. The method may further include using the collected data to generate use and state models respectively based on use and state categories of the server. The method may also include determining a state condition of the server through use of the generated use and state models to manage power utilization of the server.

17 Claims, 5 Drawing Sheets

USE AND STATE BASED POWER MANAGEMENT

BACKGROUND

Data centers typically include diverse servers used for research, development, regression testing and hardware compatibility testing, which consume a significant amount of energy. The usage patterns of many of these servers often result in extended periods of non-use and idleness. In certain areas, such as, for example, research and development data centers, based on server usage patterns and the consequent wasted energy, powering down of such servers during periods of non-use or idleness can result in significant energy and cost savings.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

1. Overview

A power management method is described herein and provides for monitoring and automatic powering down of registered servers when the registered servers are idle. Servers registered with a power management apparatus that implements the power management method may be periodically queried for server information from which a busy versus idle state of a server may be determined. Servers determined to be idle may automatically be powered down or placed into hibernation based, for example, on user settings.

Generally, the power management apparatus disclosed herein may include remote data acquisition, use and state category classification, and remote power state control of a server. For example, a server may be classified into the use categories of development or testing servers, and the state categories of "obviously busy/in use", "obviously idle" or "indeterminate". Based on the specifics of a particular data center, other use and state categories may be included. The obviously busy/in use servers may be servers that the power management apparatus has determined to be in current use. The obviously idle servers may be servers that are clearly not in use. However, the indeterminate servers may be servers that show some activity, and absent a correct determination of server activity, may be incorrectly determined as being active and thus assumed busy and left powered on.

Thus, according to an example, the power management method and apparatus disclosed herein provide for accurate determination of the state of such indeterminate state servers, such that the servers may be classified as busy or idle. Based on the determination, the servers may be selectively powered down or placed into hibernation, or a reminder or message may be sent to a user. In one regard, the power management method and apparatus disclosed herein generally enable costs associated with operating the servers to substantially be minimized by automatically and accurately determining when the servers are idle and powering down or placing into hibernation those servers determined to be idle.

2. Apparatus

Figure 1:
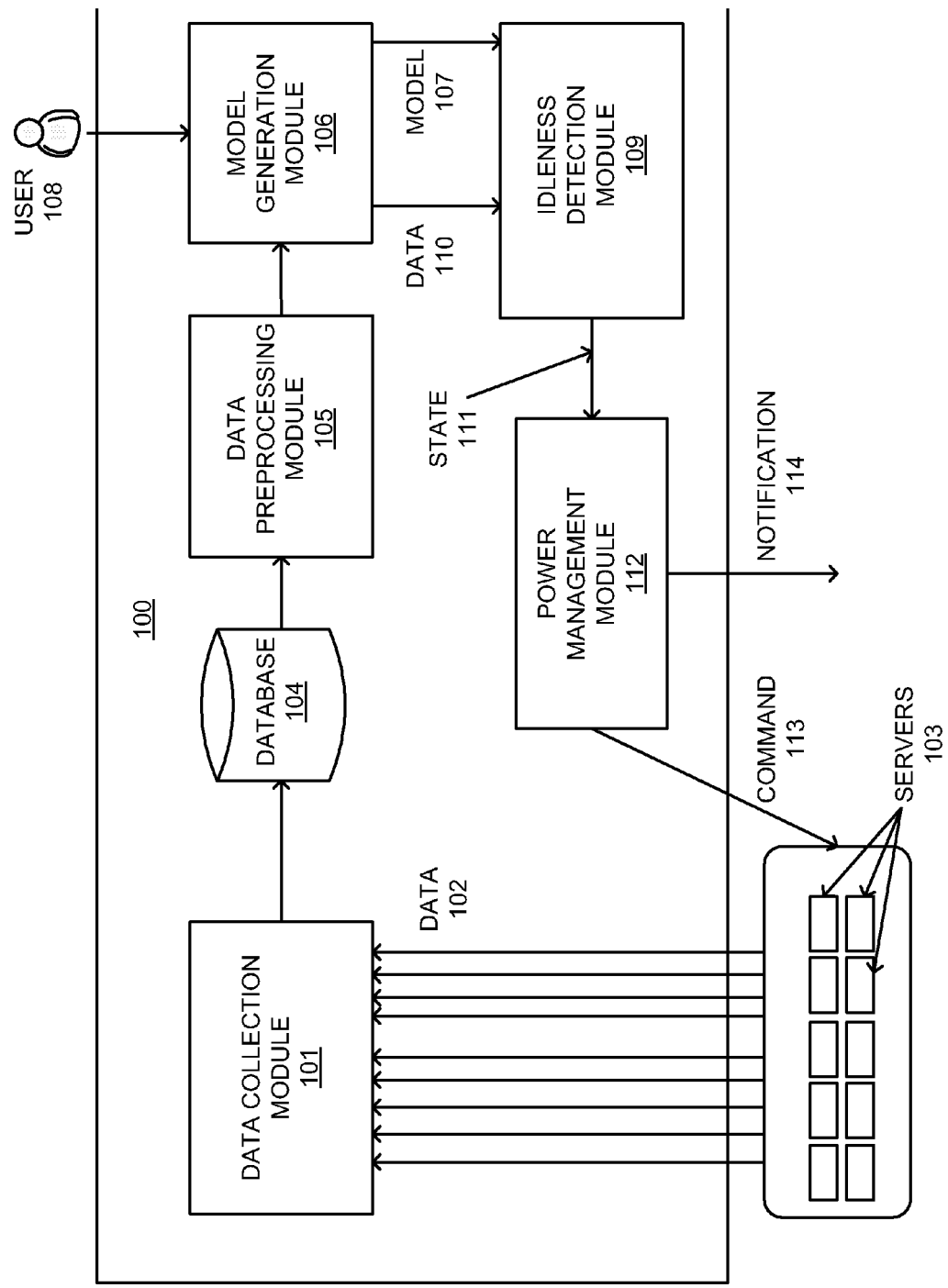
FIG. 1 illustrates an architecture of a power management apparatus, according to an example of the present disclosure.

FIG. 1 illustrates an architecture of a power management apparatus 100, according to an example. Referring to FIG. 1, the apparatus 100 may include a data collection module 101 to collect data 102 on resource utilization and process information from a host of servers 103 (or a server 103). The collected data may be stored in a database 104, which may also serve as a repository for service configuration and control information. A data preprocessing module 105 may select data from the database 104, synchronize the data and parse process information. A model generation module 106 may generate models 107 based on use categories (e.g., testing, development, etc.) and state categories (e.g., busy, idle or indeterminate) of the servers 103. The models 107 generated by the model generation module 106 may be generated during a training mode. The models 107 may be used by an idleness detection module 109 as described below during a use mode. The models based on use categories and state categories may be respectively designated use and state models. The model generation module 106 may also receive input from a user 108 as to the use and state categories of the servers 103, and/or for training the models 107 during the training mode. The idleness detection module 109 may use the models 107 generated during the training mode to determine server use (e.g., testing, development, etc.) and state (e.g., busy, idle or indeterminate) based on data 110 from the data preprocessing module 105. Alternatively, based on input of a server use (e.g., by a user) to the idleness detection module 109, the state of a server may be determined based on the data 110 from the data preprocessing module 105. Based on a state 111 of a server 103, a power management module 112 may send a command 113 to either turn off an idle server automatically via a remote management interface or via remote power strips (not shown), or send, for example, an "extended idle" notification 114 with recommendations to users.

The modules 101, 105, 106, 109, and 112 and other components of the power management apparatus 100 may comprise machine readable instructions stored on a computer readable medium. In addition, or alternatively, the modules 101, 105, 106, 109, and 112 and other components of the power management apparatus 100 may comprise hardware or a combination of machine readable instructions and hardware.

Figure 2:
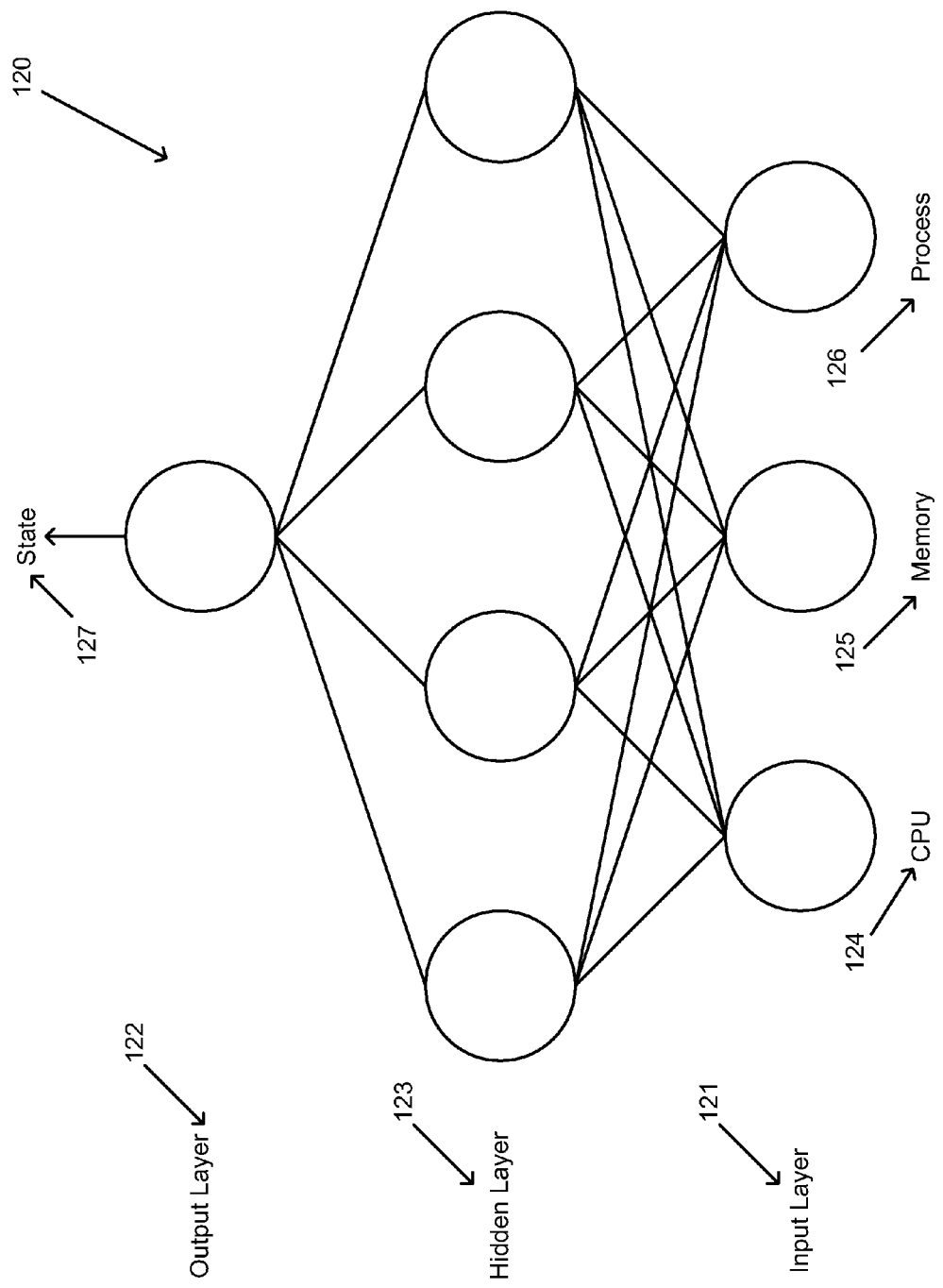
FIG. 2 illustrates a high-level diagram for an artificial neural network (ANN), according to an example of the present disclosure.

The components of the power management apparatus 100 are described in further detail with reference to FIGS. 1 and 2.

The Web-Based Enterprise Management (WBEM) initiative provides remote monitoring functionality. The WBEM initiative may exist as a loadable package for LINUX distributions. For WINDOWS machines, the WBEM initiative may be installed by default as WINDOWS Management Instrumentation (WMI). WBEM/WMI may provide access to an operating system state, to include CPU and input/output (I/O) resource utilization values, process lists, logged in user information, as well as forms of server control, such as, for example, shutdown. Other monitoring solutions may include, for example, NAGIOS, GANGLIA etc.

The differences between WMI and WBEM may also create architectural issues. For example, while both WMI and WBEM provide the same records and functionality, WBEM (common information model (CIM) operations over hypertext transfer protocol (HTTP), default on UNIX systems) may resemble extensible markup language—remote procedure calls (XMLRPC) over HTTP, while WMI connections may use the common object model (COM). Management tools may handle these differences by use of WMI proxies running, for example, on WINDOWS servers that respond to WBEM requests, make the corresponding WMI request, then format and return the information. The proxy may run on each WINDOWS machine, or via manipulation of the WBEM namespace, and a single proxy server may forward WMI requests to any number of WINDOWS machines.

Instead of relying on a WBEM-to-WMI proxy, the data collection module 101 may run a number of WMI gathering programs, such as, for example, WMI_GRABBER and WBEM gathering programs, such as, for example, WBEM_GRABBER. Each instantiation may be a multi-thread python script that monitors configuration and control information, and spawn threads, one per target server, with each server being sampled at a predetermined interval.

As discussed above, the data preprocessing module 105 may extract raw data from the database 104. The data preprocessing module 105 may process and summarize the data collected by the data collection module 101 and may generate a view of the data for the model generation module 106. The data preprocessing module 105 may provide for the selection of data for specified time ranges and specified servers 103. In addition, the data preprocessing module 105 may provide for data conversion between different time zones and may synchronize sampling data and convert the sampling data into data points of fixed measurement intervals. Moreover, the data preprocessing module 105 may parse a list of executing processes and filter operating system processes that are constantly running. The list of executing processes may be converted into a binary vector for analysis.

As described above, the model generation module 106 may generate models 107 that correlate state categories (e.g., busy, idle or indeterminate; i.e. state models) of the servers 103 based on use categories (e.g., testing, development, etc.; i.e., use models) of the servers 103. The model generation module 106 may also receive input from the user 108 as to the use and state categories of the servers 103. The categorization may include a degree of confidence such that any server categorized, for example, as idle, is indeed idle with a high degree of confidence. For example, the categorization may include confidence degree thresholds to determine whether a server is indeed idle with a medium or high degree of confidence based on the actual calculated confidence exceeding specified thresholds. Alternatively, for an actual calculated confidence being less than the specified thresholds, the server may be determined as being busy.

With regard to use categorization, in a data center, servers used in the development sector may be busy in the daytime and idle at night. The CPU utilization for such servers used for development purposes may not be as high as CPU utilization for servers used for testing purposes. For example, servers used in a testing sector may have less regular patterns and CPU utilization may be high or low. Based on training data, servers may be categorized into distinct use categories, such as, for example, development, testing, etc. The development servers and testing servers, as discussed above, may respectively include low and medium CPU and memory utilization. Additional use categories, such as, for example, continuous use, may also be included. The continuous use servers may include a relatively high percentage of high CPU and memory utilization.

For each use category, a set of patterns may be generated by clustering time series data in a training data set into distinct patterns of daily use. One technique for clustering time-series data may be to use k-means clustering. For example, k-means clustering may aim to partition n-observations into k-clusters in which each observation belongs to the cluster with the nearest mean. This results in a partitioning of the data space into Voronoi cells, which are based on a decomposition of a given space (e.g., a metric space) determined by distances to a specified family of objects (subsets) in the space.

Based on the different characteristics of operation of a server for each use category (e.g., testing, development, etc.), a model may be created for each use category to further classify a server's state into the categories busy, idle or indeterminate. Referring to FIG. 2, the state categorization may be performed, for example, using Artificial Neural Networks (ANNs), which are machine learning models that are to automatically learn to predict targets from a set of inputs. A three layer ANN 120 is shown in FIG. 2, in which, organization of fully connected, feed-forward ANNs is illustrated. More particularly, FIG. 2 depicts the ANN 120 as including an input layer 121, an output layer 122, and a hidden layer 123. The ANN 120 may be automatically calibrated without knowledge of the form of the functional relationship between input parameters and output variables. In addition, the ANN 120 may be trained using a set of training data including, for example, observations on resource utilization and process information, which may be obtained by the data collection module 101 and corresponding server usage information provided by users of a server. The input variables for the ANN 120 may include resource utilization data and process information (e.g., CPU utilization at 124, memory utilization at 125 and process information at 126), and the output variable for the ANN 120 would thus be the state 127 of a particular server.

With the user provided server usage information determining desired output, back propagation may be used to train the ANN 120. For example, a user may be requested to confirm if a determination made by the ANN 120 is indeed correct to further train the ANN 120. Thus, the ANN 120 may be trained to recognize, for example, that a particular set of metrics means that a server is idle or not-idle.

The idleness detection module 109 may determine server use (e.g., testing or development) and state (e.g., busy, idle or indeterminate) based on data 110 from the data preprocessing module 105 and the models 107 generated by the model generation module 106. Thus, once the appropriate use and state categorization models have been generated, the use and state of the server may be categorized based on data collected by the data collection module 101. More particularly, given time series usage data of a server, the idleness detection module 109, using, for example, the ANN 120, may first determine server use (e.g., testing or development) by searching the use patterns that best match the given data. Once the server use has been determined, the data may be fed into the ANN 120 to calculate the state of the server (e.g., busy, idle or indeterminate).

Based on the state 111 of a server, the power management module 112 may send the command 113 to either turn off an idle server automatically via a remote management interface or via remote power strips (not shown), or send, for example, the "extended idle" notification 114 with recommendations to users. The power management module 112 may allow remote shutting down of the servers 103 and removal of power from the shutdown servers. The power management module 112 may also provide for automatic re-starting of the shut-down servers. For example, a server may be automatically started a few minutes before an expected log-in time for a user. The power management module 112 may use standards such as, for example, wake up on local area network (LAN) or vendor specific interfaces to start and stop servers.

By turning off unused servers, the power management apparatus 100 reduces overall power consumption and cost, for example, for a data center. In order to estimate the power consumption and cost with and without use of the power management apparatus 100, the power consumption of a server may be estimated as a function of CPU utilization by using linear interpolation between the power consumed by the server at idle and the power consumed for a fully utilized state. For example, the power consumption of a server may be estimated by the following equation:

$$P=P_{idle}+(P_{full}-P_{idle})*CPU_{util} \quad (1)$$

For Equation (1), $P_{idle}$ is the idle power of a server, $P_{full}$ is the power of the server when it is fully utilized, and $CPU_{util}$ is the CPU utilization of the server. The total power consumption, for example, by a data center unit (DCU), such as, for example, an IT section of a data center, may be the sum of the power consumed by all servers and the Power Usage Effectiveness (PUE). The total power consumption may be estimated by the following equation:

$$P_{total}=P_{DCU}\cdot PUE \quad (2)$$

The power management apparatus 100 is to reduce overall power consumption and cost, for example, associated with operating a data center. The apparatus 100 provides for handling of diverse servers with a multitude of diverse operating systems, without the need for power management agents to be installed on the servers managed by the apparatus 100. Further, the apparatus 100 may be scaled to a large number of servers as data collection can be performed by the data collection module 101.

3. Method

Figure 3A:
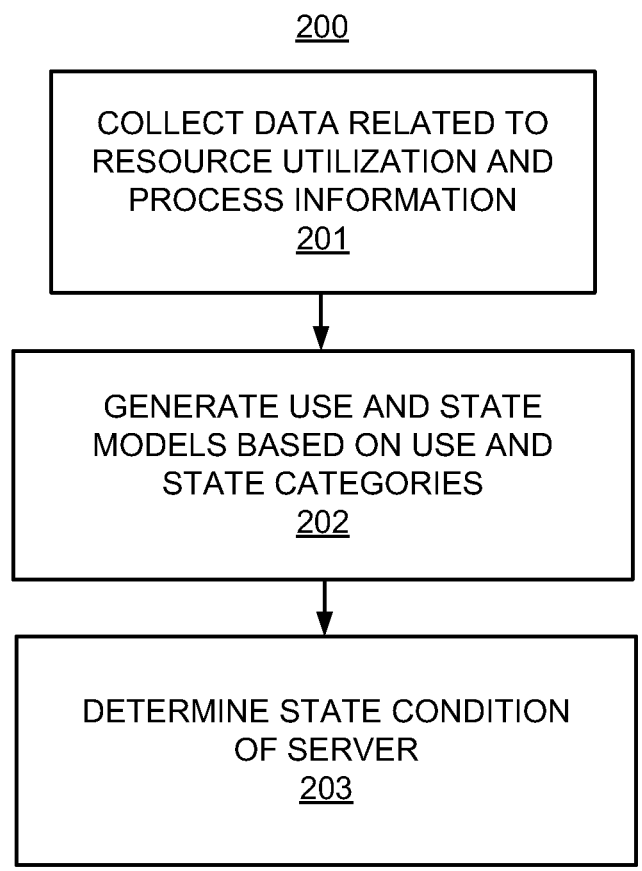
FIG. 3A illustrates a method for power management, according to an example of the present disclosure.
Figure 3B:
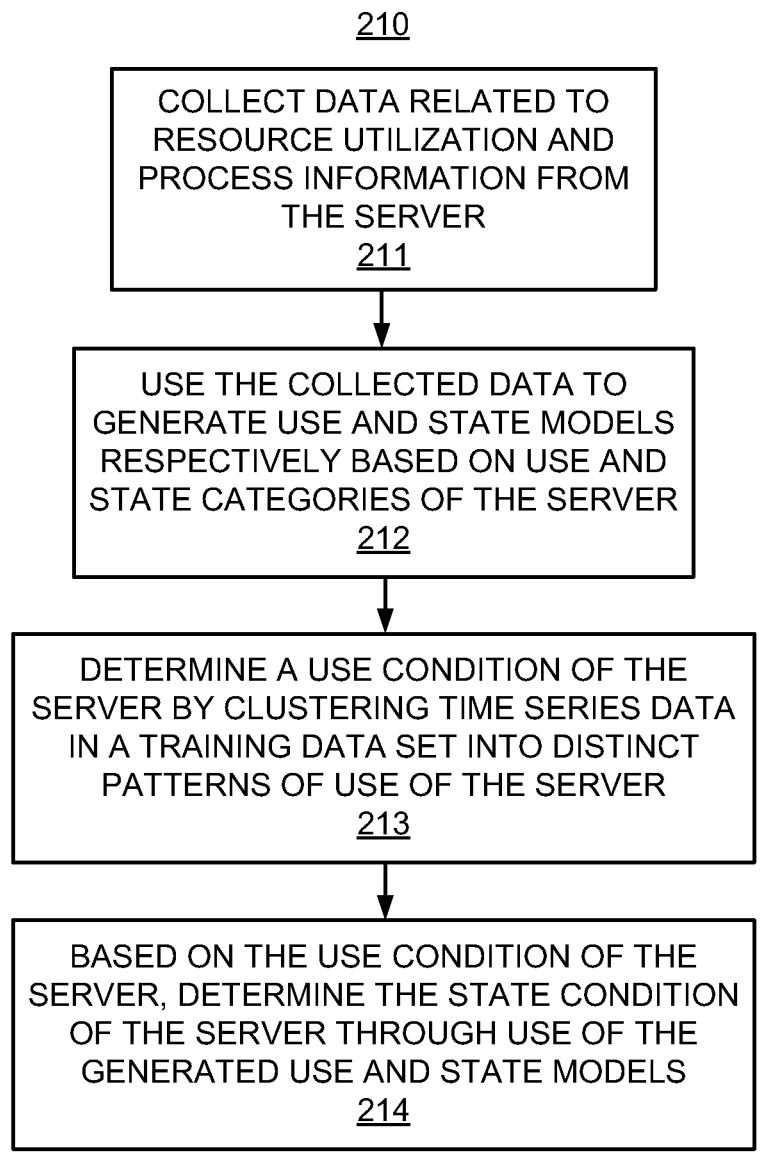
FIG. 3B illustrates further details of the method for power management, according to an example of the present disclosure.

FIGS. 3A and 3B illustrate flowcharts of methods 200 and 210 for power management, according to examples. The methods 200 and 210 may be implemented on the power management apparatus described above with reference to FIGS. 1 and 2 by way of example and not limitation. The methods 200 and 210 may be practiced in other apparatus.

Referring to FIG. 3A, at block 201, the method may include collecting data related to resource utilization and process information from a server. For example, referring to FIG. 1, the data collection module 101 may collect data 102 on resource utilization and process information from the servers 103. The collected data may be stored in a database 104, which may also serve as a repository for service configuration and control information. To collect the data, the data collection module 101 may run a number of WMI gathering programs, such as, for example, WMI_GRABBER and WBEM gathering programs, such as, for example, WBEM_GRABBER. Each instantiation of data collection may be a multi-thread python script that monitors configuration and control information, and spawn threads, one per target server, with each server being sampled at a predetermined interval.

At block 202, the method may include using the collected data to generate use and state models respectively based on use and state categories of the server. For example, referring to FIG. 1, the model generation module 106 may generate models 107 based on use categories (e.g., testing, development, etc.) and state categories (e.g., busy, idle or indeterminate) of the servers 103. For the collected data, prior to use of the collected data to generate use and state models, the data preprocessing module 105 may select data from the database 104, and synchronize the data. The data preprocessing module 105 may extract raw data from the database 104. In addition, the data preprocessing module 105 may process and summarize the data collected by the data collection module 101 and then generate a view of the data for the model generation module 106. The data preprocessing module 105 may also provide for the selection of data for specified time ranges and the servers 103, and may provide for data conversion between different time zones. The data preprocessing module 105 may further synchronize sampling data and convert the sampling data into data points of fixed measurement intervals. The data preprocessing module 105 may still further parse a list of executing processes, which may be converted into a binary vector for analysis, and filter operating system processes that are constantly running.

At block 203, the method may include determining use and state conditions of the server through use of the generated use and state models. For example, referring to FIG. 1, the idleness detection module 109 may determine server use (e.g., testing, development, etc.) and state (e.g., busy, idle or indeterminate) based on the data 110 from the data preprocessing module 105 and the models 107 generated by the model generation module 106. Alternatively, based on input of a server use (e.g., by a user) to the idleness detection module 109, the state of a server may be determined based on the data 110 from the data preprocessing module 105. As discussed above, given time series usage data of a server, the idleness detection module 109 may first determine server use (e.g., testing, development, etc.) by searching the use patterns that best match the given data. Once the server use has been determined, the data may be fed into the ANN 120 to calculate the state of the server (e.g., busy, idle or indeterminate).

Referring to FIG. 3B, at block 211, the method may include collecting data related to resource utilization and process information from the server. For example, referring to FIG. 1, the data collection module 101 may collect data 102 on resource utilization and process information from the servers 103.

Referring to FIG. 3B, at block 212, the method may include using the collected data to generate use and state models respectively based on use and state categories of the server. For example, referring to FIG. 1, the model generation module 106 may generate models 107 based on use categories (e.g., testing, development, etc.) and state categories (e.g., busy, idle or indeterminate) of the servers 103.

Referring to FIG. 3B, at block 213, the method may include determining a use condition of the server by clustering time series data in a training data set into distinct patterns of use of the server. For example, referring to FIG. 1, the idleness detection module 109 may determine a server use (e.g., testing, development, etc.) condition by clustering time series data in a training data set into distinct patterns of use of the server.

Referring to FIG. 3B, at block 214, based on the use condition of the server, the method may include determining the state condition of the server through use of the generated use and state models. For example, referring to FIG. 1, based on the use condition of the server, the idleness detection module 109 may determine a server state (e.g., busy, idle or indeterminate) condition based on the models 107 generated by the model generation module 106.

4. Computer Readable Medium

Figure 4:
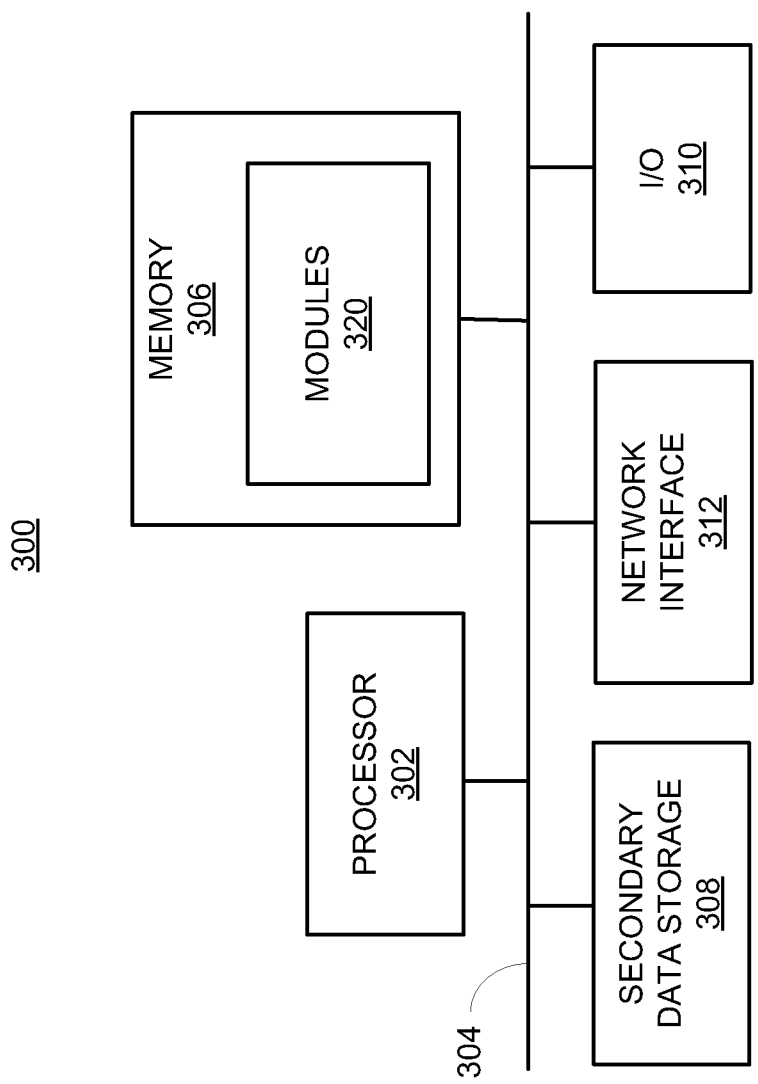
FIG. 4 illustrates a computer system, according to an example of the present disclosure.

FIG. 4 shows a computer system 300 that may be used with the examples described herein. The computer system 300 represents a generic platform that includes components that may be in a server or another computer system. The computer system 300 may be used as a platform for the apparatus 100. The computer system 300 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 300 includes a processor 302 that may implement or execute machine readable instructions performing some or all of the methods, functions and other processes described herein. Commands and data from the processor 302 are communicated over a communication bus 304. The computer system 300 also includes a main memory 306, such as a random access memory (RAM), where the machine readable instructions and data for the processor 302 may reside during runtime, and a secondary data storage 308, which may be non-volatile and stores machine readable instructions and data. The memory and data storage are examples of computer readable mediums. The memory 306 may include modules 320 including machine readable instructions residing in the memory 306 during runtime and executed by the processor 302. The modules 320 may include the modules 101, 105, 106, 109 and 112 of the apparatus 100 shown in FIG. 1.

The computer system 300 may include an I/O device 310, such as a keyboard, a mouse, a display, etc. The computer system 300 may include a network interface 312 for connecting to a network. Other known electronic components may be added or substituted in the computer system 300.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated

What is claimed is:

1. A method for power management, the method comprising:
   collecting data related to resource utilization and process information from a server;
   using the collected data to generate use and state models respectively based on use and state categories of the server, wherein the use categories include types of uses of the server; and
   determining, by a processor, a state condition of the server through use of the generated use and state models to manage power utilization of the server.

2. The method of claim 1, wherein the types of uses of the server include testing and development uses of the server based on central processing unit (CPU) utilization over a predetermined time interval.

3. The method of claim 1, wherein the state categories include busy, idle and indeterminate states of the server based on central processing unit (CPU) utilization.

4. The method of claim 1, further comprising:
   forwarding a command to alter a power state of the server based on the determined state condition of the server.

5. The method of claim 1, further comprising:
   forwarding a command to power off an idle server automatically via a remote management interface or forwarding a command to power on a powered off server automatically via the remote management interface.

6. The method of claim 1, further comprising:
   forwarding a notification to a user to turn off or power on the server.

7. The method of claim 1, further comprising:
   generating the use and state models respectively based on the use and state categories, and further based on user input.

8. The method of claim 1, wherein the use and state categories include a determination of a degree of confidence related to the state condition of the server.

9. The method of claim 1, further comprising:
   determining a use condition of the server by clustering time series data in a training data set into distinct patterns of use of the server.

10. The method of claim 1, further comprising:
    determining a use condition of the server by k-means clustering of time series data in a training data set into distinct patterns of use of the server.

11. The method of claim 1, wherein the state condition of the server is determined by an artificial neural network (ANN).

12. The method of claim 11, wherein input variables to the ANN include central processing unit (CPU) utilization, memory utilization and the process information.

13. The method of claim 1, further comprising running WINDOWS management instrumentation (WMI) gathering programs and web-based enterprise management (WBEM) gathering programs to collect the data on resource utilization and process information from the server.

14. An apparatus for determining a state condition of a server, the apparatus comprising:
    a memory storing a module comprising machine readable instructions to:
       collect data related to resource utilization and process information from the server;
       use the collected data to generate use and state models respectively based on use and state categories of the server, wherein the use categories include types of uses of the server;
       determine a use condition of the server by clustering time series data in a training data set into distinct patterns of use of the server; and
       based on the use condition of the server, determine the state condition of the server through use of the generated use and state models; and
    a processor to implement the module.

15. A non-transitory computer readable medium having stored thereon a computer executable program for power management, the computer executable program when executed causes a computer system to:
    collect data related to resource utilization and process information from a server;

use the collected data to generate use and state models respectively based on use and state categories of the server, wherein the use categories include types of uses of the server;

determine, by a processor, a state condition of the server through use of the generated use and state models; and forward a command to alter a power state of the server based on the determined state condition of the server to manage power utilization of the server.

16. The method of claim 1, wherein using the collected data to generate use and state models respectively based on use and state categories of the server further comprises:

generating the use and state models during a training mode related to the server.

17. The method of claim 1, wherein determining a state condition of the server through use of the generated use and state models to manage power utilization of the server further comprises:

forwarding a command to power on a powered off server at a predetermined time period before an expected log-in time for a user.

* * * * *